(12) United States Patent
Patil et al.

(10) Patent No.: US 11,624,324 B2
(45) Date of Patent: Apr. 11, 2023

(54) AIR STARTER WITH OFFSET INTERFACE

(71) Applicant: Unison Industries, LLC, Jacksonville, FL (US)

(72) Inventors: Sharad Pundlik Patil, Bangalore (IN); Subrata Nayak, Bangalore (IN); David Allan Dranschak, Union, OH (US); Shiloh Montegomery Meyers, Miamisburg, OH (US); Bajarang Agrawal, Bangalore (IN); Jasraj Asdev, Bangalore (IN); Ravindra Shankar Ganiger, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/373,871

(22) Filed: Jul. 13, 2021

(65) Prior Publication Data
US 2022/0018288 A1    Jan. 20, 2022

(30) Foreign Application Priority Data
Jul. 15, 2020   (IN) .............................. 202011030169

(51) Int. Cl.
| F02C 7/277 | (2006.01) |
| F02C 7/06 | (2006.01) |
| F02C 7/36 | (2006.01) |

(52) U.S. Cl.
CPC ................ *F02C 7/277* (2013.01); *F02C 7/06* (2013.01); *F02C 7/36* (2013.01); *F05D 2240/61* (2013.01); *F05D 2260/36* (2013.01); *F05D 2260/40311* (2013.01); *F05D 2260/85* (2013.01)

(58) Field of Classification Search
CPC .... F02C 7/277; F02C 7/06; F02C 7/36; F05D 2240/61; F05D 2260/36; F05D 2260/40311; F05D 2260/85
See application file for complete search history.

(56) References Cited

U.S. PATENT DOCUMENTS

| 2,625,047 | A | 1/1953 | Wood |
| 2,651,493 | A | 9/1953 | Volk, Jr. |
| 3,003,313 | A | 10/1961 | Bunger |
| 4,473,317 | A | 9/1984 | Bolang |
| 6,814,539 | B2 | 11/2004 | Farnsworth et al. |
| 9,752,508 | B2 | 9/2017 | Geck et al. |
| 2015/0292414 | A1* | 10/2015 | Geek ........................ F02C 7/27 137/599.11 |
| 2017/0356345 | A1* | 12/2017 | Rodriguez .............. F02C 7/275 |
| 2018/0328286 | A1 | 11/2018 | Nayak et al. |
| 2019/0331176 | A1 | 10/2019 | LeBeau et al. |

FOREIGN PATENT DOCUMENTS

| GB | 805666 A | 12/1958 |
| GB | 885542 A | 12/1961 |

\* cited by examiner

*Primary Examiner* — Steven M Sutherland
(74) *Attorney, Agent, or Firm* — McGarry Bair PC

(57) ABSTRACT

An air starter for an engine, such as a turbine engine, that includes a turbine for rotatably extracting mechanical power from a flow of fluid. The turbine includes a drive shaft that can be coupled to an output shaft to provide a rotational output. The interface between the drive shaft and the output shaft can be offset.

20 Claims, 9 Drawing Sheets

AIR STARTER WITH OFFSET INTERFACE

CROSS-REFERENCE TO RELATED APPLICATION

This application claims priority to Indian Application No. 202011030169, filed Jul. 15, 2020, which is incorporated herein by reference its entirety.

TECHNICAL FIELD

The disclosure generally relates to an air starter, and, more specifically, to an offset interface in an air starter for a turbine engine.

BACKGROUND

A turbine engine, for example a gas turbine engine, is engaged in regular operation to an air starter. Air starters are typically mounted to the turbine engine through a gearbox or other transmission assembly. The transmission transfers power from the starter to the turbine engine to assist in starting the turbine engine. The internal components of both the turbine engine and the air starter spin together such that the air starter can be used to start the turbine engine.

BRIEF DESCRIPTION

Aspects and advantages of the disclosure will be set forth in part in the following description, or may be obvious from the description, or may be learned through practice of the disclosure.

In one aspect, the present disclosure generally relates to an air starter that includes a housing defining an interior having a primary inlet and a primary outlet to define a primary air flow path from the primary inlet to the primary outlet. A turbine is located in the interior of the housing, where the turbine includes a rotor with a plurality of circumferentially spaced blades. A drive shaft extends from the rotor to a gear train located in a gear box in the interior. An output shaft couples to the gear train. A spline connection, located upstream of the rotor or between the rotor and the gear train, includes a first spline interface provided on the drive shaft and a second spline interface, enmeshed with the first spline interface, provided on the output shaft. At least one pilot guide, located between the rotor and the gear train, includes a first pilot element provided on the drive shaft and a second pilot element provided on the output shaft, wherein the first pilot element axially overlaps, at least in part, the second pilot element.

In another aspect, the present disclosure generally relates to an air starter that includes a housing defining an interior having a primary inlet and a primary outlet to define a primary air flow path from the primary inlet to the primary outlet. A gear box, located in the interior, includes a gear train and a sun gear shaft wherein the gear train is rotatably coupled the sun gear shaft. A turbine, located in the interior, includes a rotor with a plurality of circumferentially spaced blades. A drive shaft extends from the rotor wherein the drive shaft includes at least one sleeve receiving at least a portion of the sun gear shaft. A spline connection, located upstream of the rotor or between the rotor and the gear train, includes a first spline interface provided on the drive shaft and a second spline interface, enmeshed with the first spline interface, provided on the sun gear shaft. At least one pilot guide, located between the rotor and the gear train, axially spaced from the spline connection, includes a first pilot element provided on the drive shaft and a second pilot element provided on the sun gear shaft, wherein the first pilot element overlaps at least a portion of the second pilot element.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

DETAILED DESCRIPTION

Figure 1:
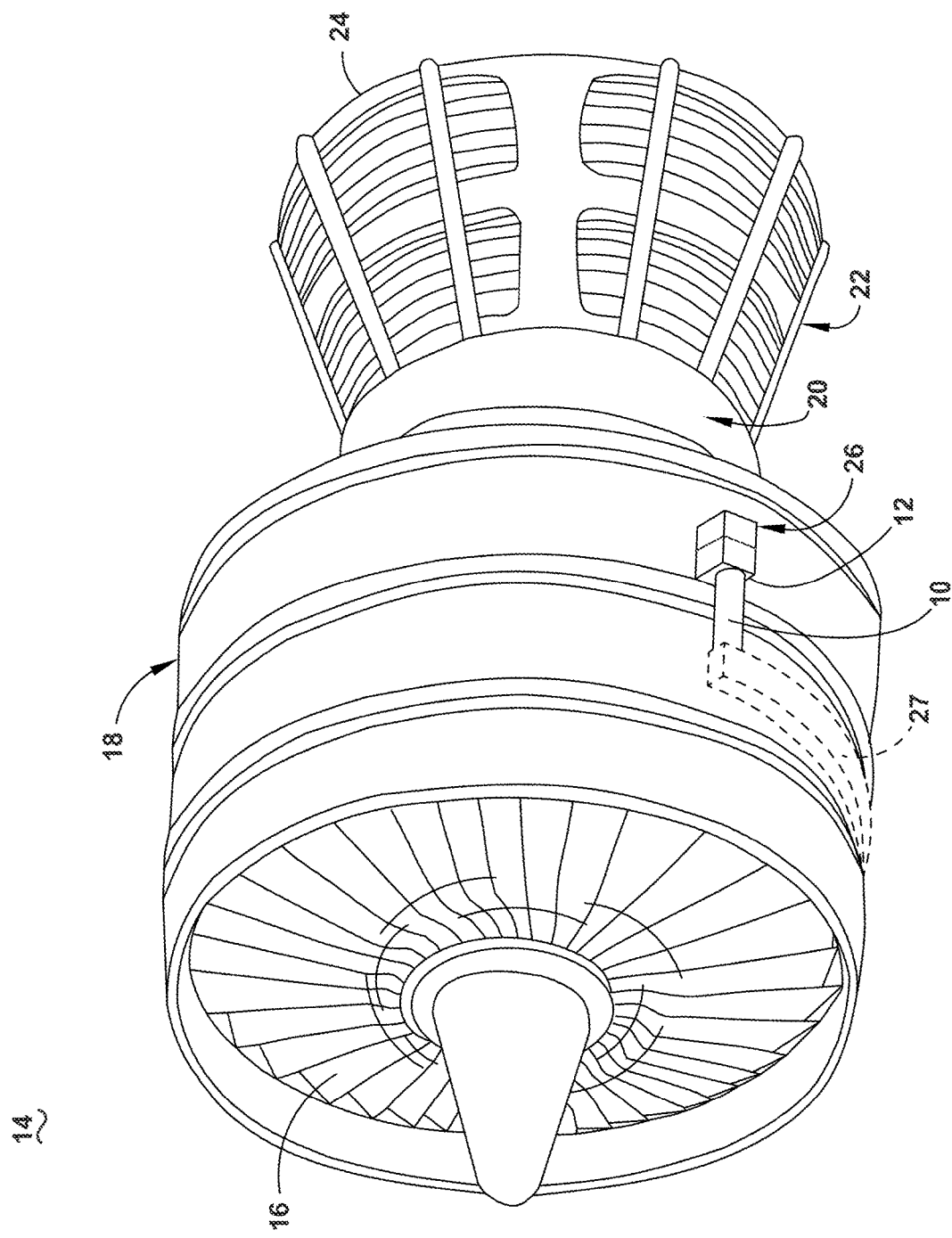
FIG. 1 is a schematic illustration of a turbine engine with an air starter.

Aspects of the disclosure described herein are directed to a turbine engine with a starter that includes a spline interface axially spaced from a pilot interface that couple a sleeve of a turbine and an output shaft. For purposes of illustration, the present disclosure will be described with respect to an air starter for an aircraft turbine engine. For example, the disclosure can have applicability in other vehicles or engines, and can be used to provide benefits in industrial, commercial, and residential applications as further described in FIG. 7.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a starter motor or air starter 10 is coupled to an accessory gear box (AGB) 12, also known as a transmission housing, and together are schematically illustrated as being mounted to a turbine engine 14 such as a gas turbine engine. The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of the shaft to power the fan 16. The turbine engine 14 can be a turbofan engine or it could be a variety of other known turbine engines such as a turboprop or turboshaft.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft or vehicle. For example, power accessories can include, but are not limited to, fuel pumps, electrical systems, and cabin environment controls. The air starter 10 can be mounted on the outside of either the air intake region containing the fan 16 or on the core near the high pressure compression region 18. Optionally, an air intake conduit 27 can couple to the air starter 10. The air intake conduit 27 can supply the air starter 10 with pressurized air.

Figure 2:
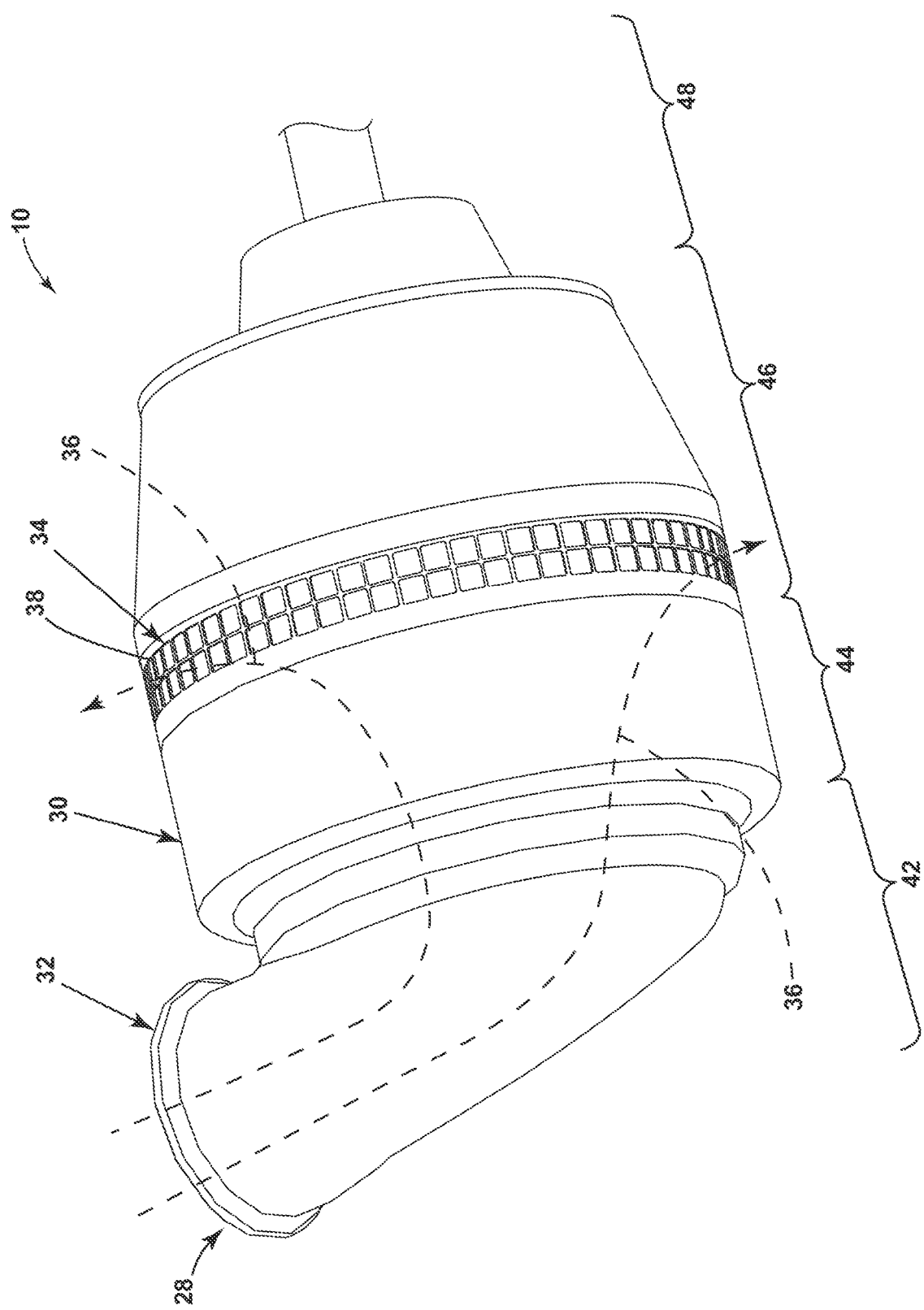
FIG. 2 further illustrates the air starter of FIG. 1.

Referring now to FIG. 2, an example of an air starter 10 is shown. Generally, the air starter 10 includes a housing 30 defining an interior 28 having a primary inlet 32 and a primary outlet 34. A primary air flow path 36, illustrated schematically with an arrow, extends between the primary inlet 32 and the primary outlet 34 for communicating a flow of fluid, including, but not limited to gas, compressed air, or the like, there through. The primary outlet 34 can include a plurality of circumferentially arranged openings 38 in a peripheral wall of the housing 30. In this configuration, the primary inlet 32 is an axial inlet and the primary outlet 34 is a radial or circumferential outlet alone the periphery of the housing 30.

The housing 30 can be made up of two or more parts that are combined together or can be integrally formed as a single piece. In the depicted aspects of the disclosure, the housing 30 of the air starter 10 generally defines, in an axial series arrangement, an inlet assembly 42, a turbine section 44, a gear box 46, and a drive section 48. The air starter 10 can be formed by any materials and methods, including, but not limited to, additive manufacturing or die-casting of high strength and lightweight metals such as aluminum, stainless steel, iron, or titanium. The housing 30 and the gear box 46 can be formed with a thickness sufficient to provide adequate mechanical rigidity without adding unnecessary weight to the air starter 10.

Figure 3:
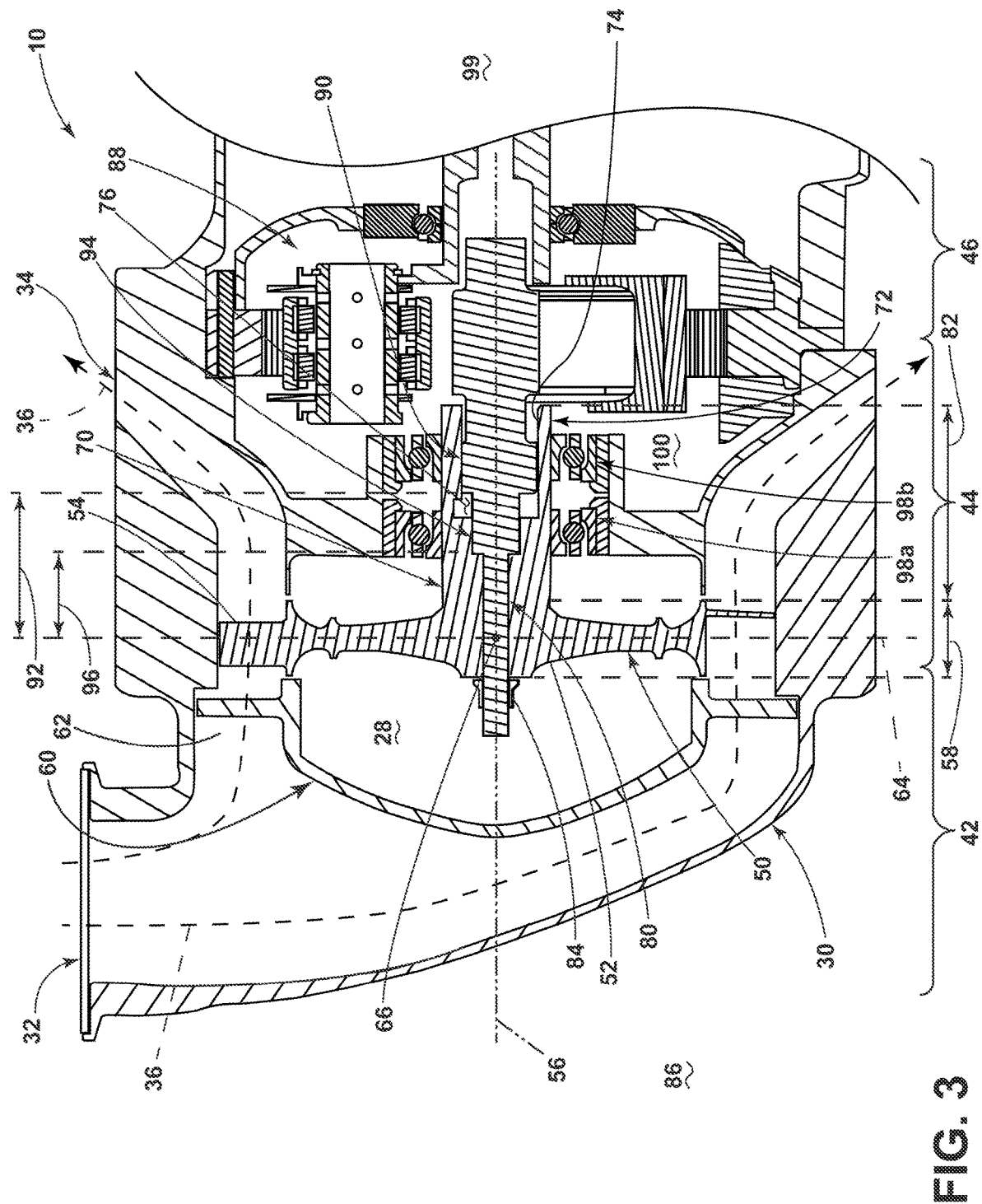
FIG. 3 is a schematic cross-sectional view of a portion of the air starter of FIG. 2 that includes a turbine and an output shaft.

FIG. 3 is a schematic cross section of the air starter 10 of FIG. 2 which shows the inlet assembly 42, the turbine section 44, and the gear box 46 in greater detail. The turbine section 44 can include a turbine 50 located within the housing 30. The turbine 50 can include a rotor 52 and a plurality of circumferentially spaced blades 54. The rotor 52 can be mounted to the housing in a manner for rotation, for example, the rotor 52 can be journaled within the housing 30. The plurality of circumferentially spaced blades 54 can be disposed in the primary air flow path 36 for rotatably extracting mechanical power from the flow of gas from the primary inlet 32 to the primary outlet 34. The turbine 50, the rotor 52, and the plurality of circumferentially spaced blades 54 can rotate about an axis of rotation 56. A rotor width 58 can be defined as the axial width of the rotor 52 of the turbine 50.

The inlet assembly 42 can include a stator 60 to guide the air flow in the primary air flow path 36. By way of non-limiting example, the stator 60 can define at least a portion of the primary air flow path 36 from the primary inlet 32 to the rotor 52. The stator 60 can include a permeable portion 62, where air in the primary air flow path 36 can pass through the stator 60. The permeable portion 62 can be at least one airfoil, nozzle, vent, or any other structure used to direct or allow the through flow of air.

A rotor centerline 64 can pass through a center point 66 of the turbine 50. Further, the rotor centerline 64 can be generally perpendicular to the axis of rotation 56. Generally perpendicular in this context means that the angle between the rotor centerline 64 and the axis of rotation 56 can be between or includes 80 degrees to 100 degrees.

A drive shaft 70 can extend in an axial direction from the rotor 52 of the turbine 50 where the axial direction is defined in the axial direction of the axis of rotation 56. As illustrated, by way of non-limiting example, the drive shaft 70 can include a sleeve portion 72 having an inner surface 74 that defines a hollow interior 76. The hollow interior 76 can receive at least a portion of a sun gear shaft or output shaft 80. That is, at least a portion of the drive shaft 70 can be tubular, where the output shaft 80 can be received in the hollow interior 76 of the drive shaft 70. The sleeve portion 72 can extend from the rotor 52 a sleeve distance 82.

The output shaft 80 can extend through at least a portion of the inlet assembly 42, the turbine section 44, and the gear box 46. By way of non-limiting example, a retaining element 84 can couple to the drive shaft 70 on a forward side 86 of the rotor 52. The drive shaft 70 can extend through the retaining element 84, the rotor 52, the drive shaft 70, one or more gears or clutch assemblies such as a gear train 88 in the gear box 46. The output shaft 80 can rotatably couple to the gear train 88, so that the output shaft 80 provides a rotational output from the turbine 50 or rotor 52 to the gear train 88. That is, the output shaft 80 allows for the transfer of energy from air in the primary air flow path 36 to rotational mechanical power.

A spline connection 90 can be used to couple the drive shaft 70 to the output shaft 80. The spline connection 90 provides an interface between the drive shaft 70 and the output shaft 80, so that the output shaft 80, the drive shaft 70, and the turbine 50 have generally the same angular velocity. That is, the rotor 52 rotationally drives the output shaft 80 that is coupled to the sleeve portion 72 of the drive shaft 70 that extends axially from the rotor 52.

Figure 7:
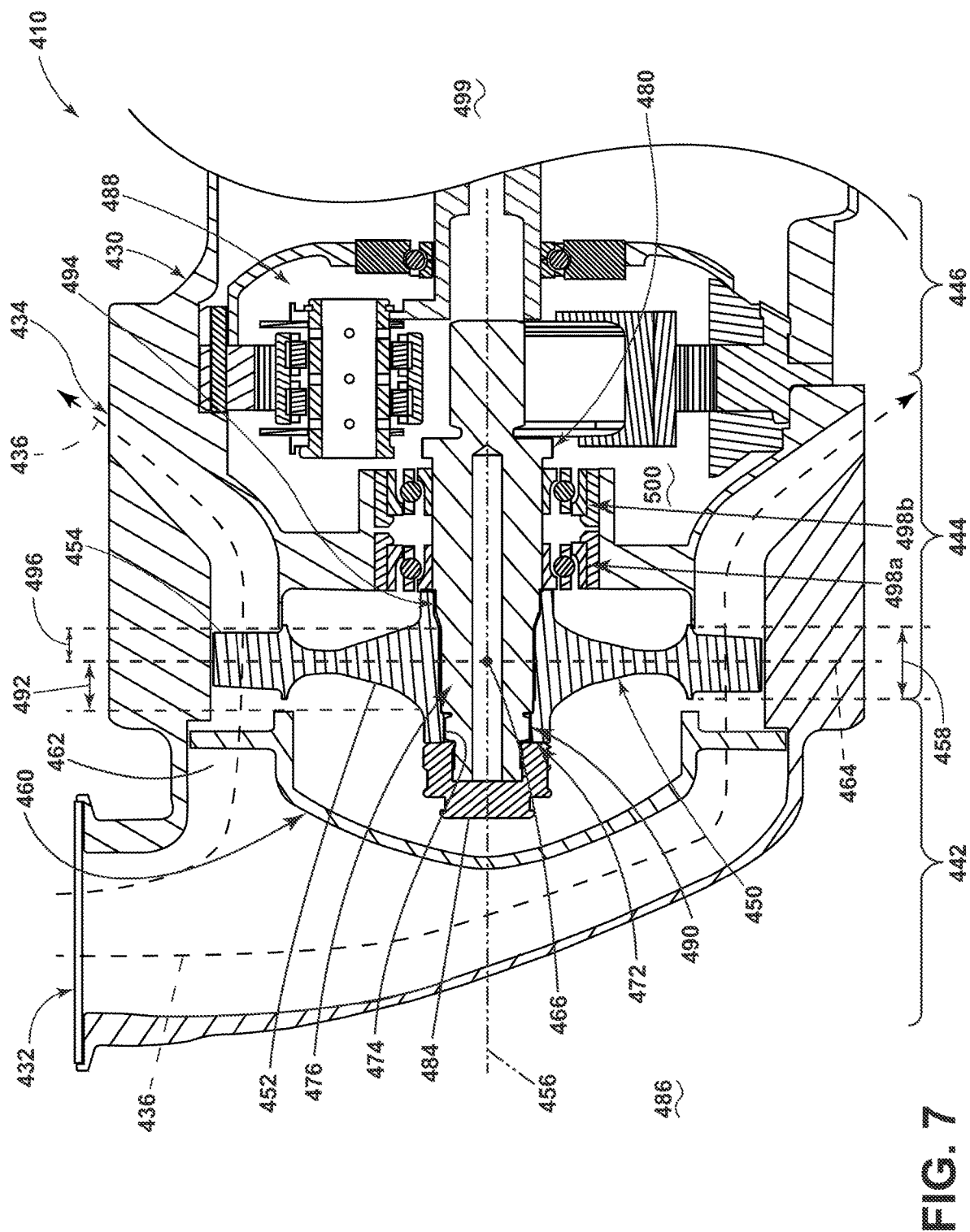
FIG. 7 is another variation of the schematic cross-sectional view of FIG. 3.

The spline connection 90 is illustrated, by way of non-limiting example, as located axially between the rotor 52 and the gear train 88, however, the spline connection 90 can be located upstream of the rotor 52, as further illustrated in FIG. 7.

A spline distance 92 can be defined by the axial distance from the rotor centerline 64 to the spline connection 90. By way of non-limiting example, the spline distance 92 is illustrated as the distance between the rotor centerline 64 and the forward side 86 of the spline connection 90. The spline distance 92 is greater than or equal to half the rotor width 58. In other words, the spline connection 90 is offset from the turbine 50, therefore the spline connection 90 is an example of an offset interface.

At least one pilot guide 94 can be located between the rotor 52 and the gear train 88 and axially spaced from the spline connection 90. The at least one pilot guide 94 can axially locate the output shaft 80 relative to the drive shaft 70.

A pilot distance 96 can be defined by the axial distance from the rotor centerline 64 to the at least one pilot guide 94. By way of non-limiting example, the pilot distance 96 is illustrated as the distance between the rotor centerline 64 and the forward side 86 of the at least one pilot guide 94. While the pilot distance 96 is illustrated as smaller or less than the spline distance 92, it is contemplated that the pilot distance 96 can be greater than the spline distance 92.

The pilot distance 96 is greater than or equal to half the rotor width 58. In other words, the at least one pilot guide 94 is offset from the turbine 50, therefore the at least one pilot guide 94 is another example of an offset interface.

At least one bearing assembly, such as a thrust bearing, can be configured to rotatably support the drive shaft 70. While the at least one bearing assembly is illustrated as a first bearing assembly 98a and a second bearing assembly 98b, any number of bearings or thrust bearings are contemplated. The first bearing assembly 98a and the second bearing assembly 98b can rotatably support the drive shaft 70 at a location that is on a rear side 99 of the turbine 50 and the forward side 86 of the gear train 88. The first bearing assembly 98a can be radially adjacent the at least one pilot guide 94. The second bearing assembly 98b can be radially adjacent the spline connection 90. However, any location in relationship to the drive shaft 70 of the first and second bearing assembly 98a, 98b is contemplated.

The first bearing assembly 98a or the second bearing assembly 98b can be located in a wet portion 100 of the housing 30. That is, the first bearing assembly 98a or the second bearing assembly 98b can be lubricated with a grease or oil in the wet portion 100 of the housing 30. The wet portion 100 is a cavity or portion in the housing 30 that is exposed to grease, oil, or other know coolants or liquids, whereas a dry portion can be a cavity or portion that is not exposed to liquid. By way of non-limiting example of contrast, the forward side of the turbine 50 is a dry portion of the housing 30.

Figure 4:
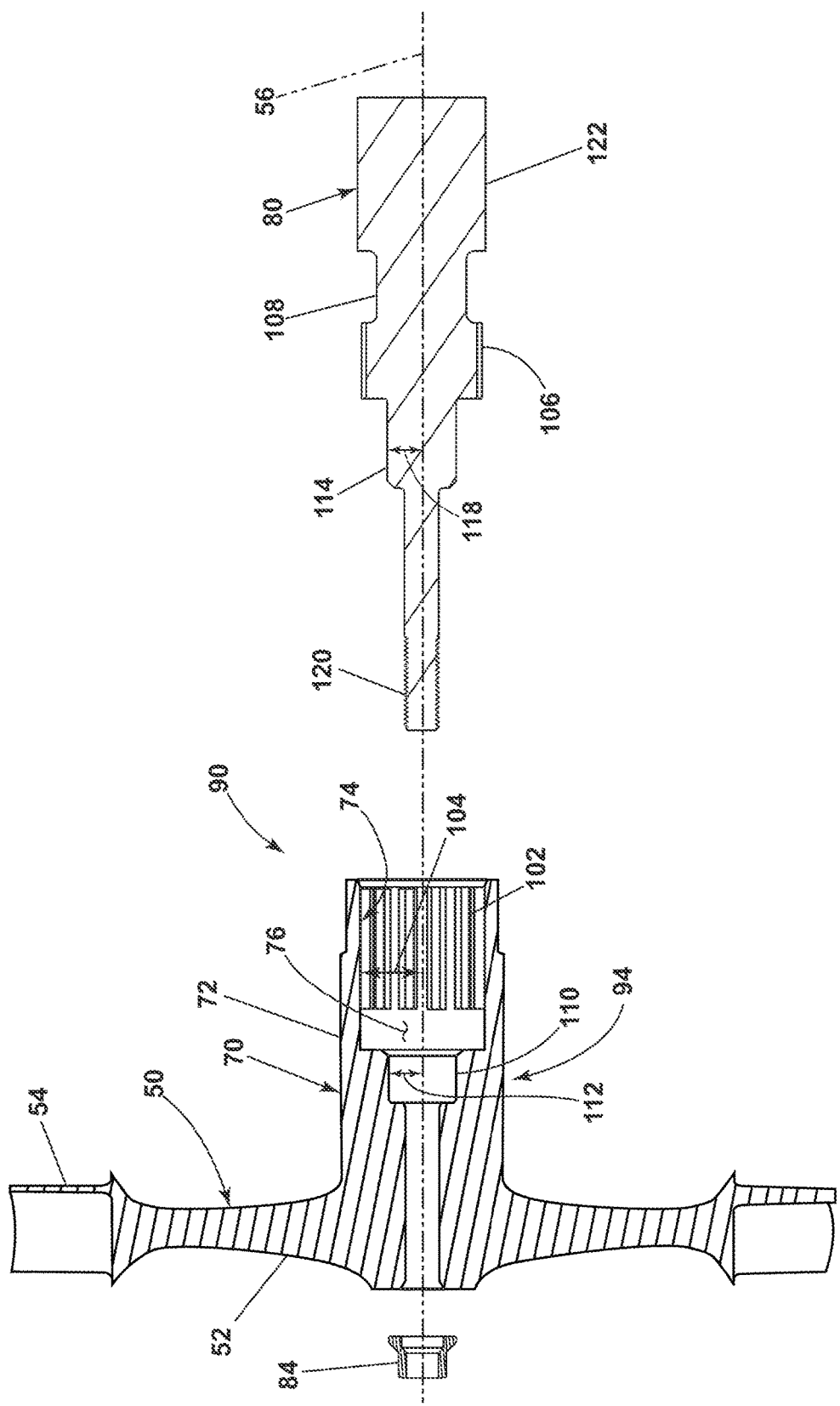
FIG. 4 is an exploded enlarged cross section of the turbine and the output shaft of FIG. 3.

FIG. 4 is an exploded view of the turbine 50, retaining element 84, and output shaft 80. A first spline interface 102 is provided on the drive shaft 70. The first spline interface 102 can be defined by a portion of the inner surface 74 of the sleeve portion 72 of the drive shaft 70. The first spline interface 102 can be notched or serrated so that portions of the first spline interface 102 extend radially into the hollow interior 76 of the drive shaft 70. The first spline interface 102 can have a first spline radius 104 measured from the axis of rotation 56 to a recess in the first spline interface 102.

A second spline interface 106 is provided on the output shaft 80. The second spline interface 106 can be located on an outer surface 108 of a portion of the output shaft 80 received by the drive shaft 70. The second spline interface 106 can be notched or serrated so that portions of the second spline interface 106 extend radially outward from the output shaft 80.

The first spline interface 102 is enmeshed with the second spline interface 106 to form the spline connection 90 when the output shaft 80 is received by the drive shaft 70 as illustrated in FIG. 3. Further, when enmeshed, the first spline interface 102 circumscribes at least part of the second spline interface 106.

A first pilot element 110 is provided on the drive shaft 70. The first pilot element 110 can be defined by a portion of the inner surface 74 axially spaced from the first spline interface 102. The first pilot element 110 is illustrated as being a smooth surface, however, it is contemplated that the first pilot element 110 can be notched or serrated. The first pilot element 110 can have a first pilot radius 112 measured from the axis of rotation 56 to the portion of the inner surface 74 that defines the first pilot element 110. While the first pilot radius 112 is illustrated as less than the first spline radius 104, it is contemplated that the first pilot radius 112 can be greater than the first spline radius 104.

A second pilot element 114 is provided on the output shaft 80. The second pilot element 114 can be located on the outer surface 108 of a portion of the output shaft 80 received by the drive shaft 70 and axially spaced from the second spline interface 106. The second pilot element 114 illustrated as being a smooth surface, however, it is contemplated that the second pilot element 114 can be notched or serrated to compliment the first pilot element 110. The second pilot element 114 can have a second pilot radius 118 measured from the axis of rotation 56 to the outer surface 108 that defines the second pilot element 114.

The first pilot element 110 and the second pilot element 114 can form the at least one pilot guide 94, where the first pilot element 110 circumscribes at least a portion of the second pilot element 114. (FIG. 3) A diametric fit or tight fit between the first pilot element 110 and the second pilot element 114 can secure the radial and axial location of the output shaft 80. The first pilot radius 112 can be between 0.01% and 10% larger than the second pilot radius 118, defining the tight fit between the first and second pilot elements 110, 114. The tight fit can provide clearance needed to accommodate movement of one or more components or to accommodate thermal expiation or contraction or one or more components.

The output shaft 80 can further include a threaded portion 120 used to position the retaining element 84. Further, the output shaft 80 includes a sun gear 122 that can rotatably connect with the gear train 88.

In operation, a fluid, for example air, is supplied to the air starter 10. The air enters the primary air flow path 36 through the primary inlet 32. The energy from the air is transformed to mechanical energy by the of the turbine 50, which rotates in response to the air flow through the plurality of circumferentially spaced blades 54. The turbine 50 includes the drive shaft 70, which extends axially from the rotor 52. The drive shaft 70 circumscribes the forward side 86 portion of the output shaft 80. The drive shaft 70 and output shaft 80 are coupled by the spline connection 90, so that they rotate at generally the same angular velocity. The at least one pilot guide 94 helps to position the output shaft 80 within the drive shaft 70. The at least one pilot guide 94 provides support to the axial position of the output shaft 80. Further, the at least one pilot guide 94 can also provide radial alignment of the output shaft 80.

The rear side 99 portion of the output shaft 80 is rotatably coupled to the gear train 88, which can transfer the mechanical power to the turbine engine 14. The first and second bearings 98a, 98b rotatably support the drive shaft 70. The retaining element 84 can be threaded to the output shaft 80 on the forward side 86 of the rotor 52 to further axially locate the output shaft 80.

The offset of the spline connection 90 from the center point 66 of the rotor 52 reduces forces on the rotor 52. The offset interferences, that is, the spline connection 90 and the at least one pilot guide 94, allow for an increase in contact area between the turbine 50 and the output shaft 80 which can further reduce stress on the turbine 50.

The offset of the spline connection 90 further enables the turbine 50 and the output shaft 80 to be made of different materials. By way of non-limiting example, the turbine 50 can be made of titanium which is a lighter weight and durable material, while the output shaft 80 can be made of steel or another metal better suited to interface with the gear train 88. Having the transition from titanium to steel outside the gear box 46 or gear train 88 allows the sun gear 122 portion of the output shaft 80 to have a smaller. The smaller diameter of the sun gear 122 can result in the air starter 10 being more compact.

Figure 5:
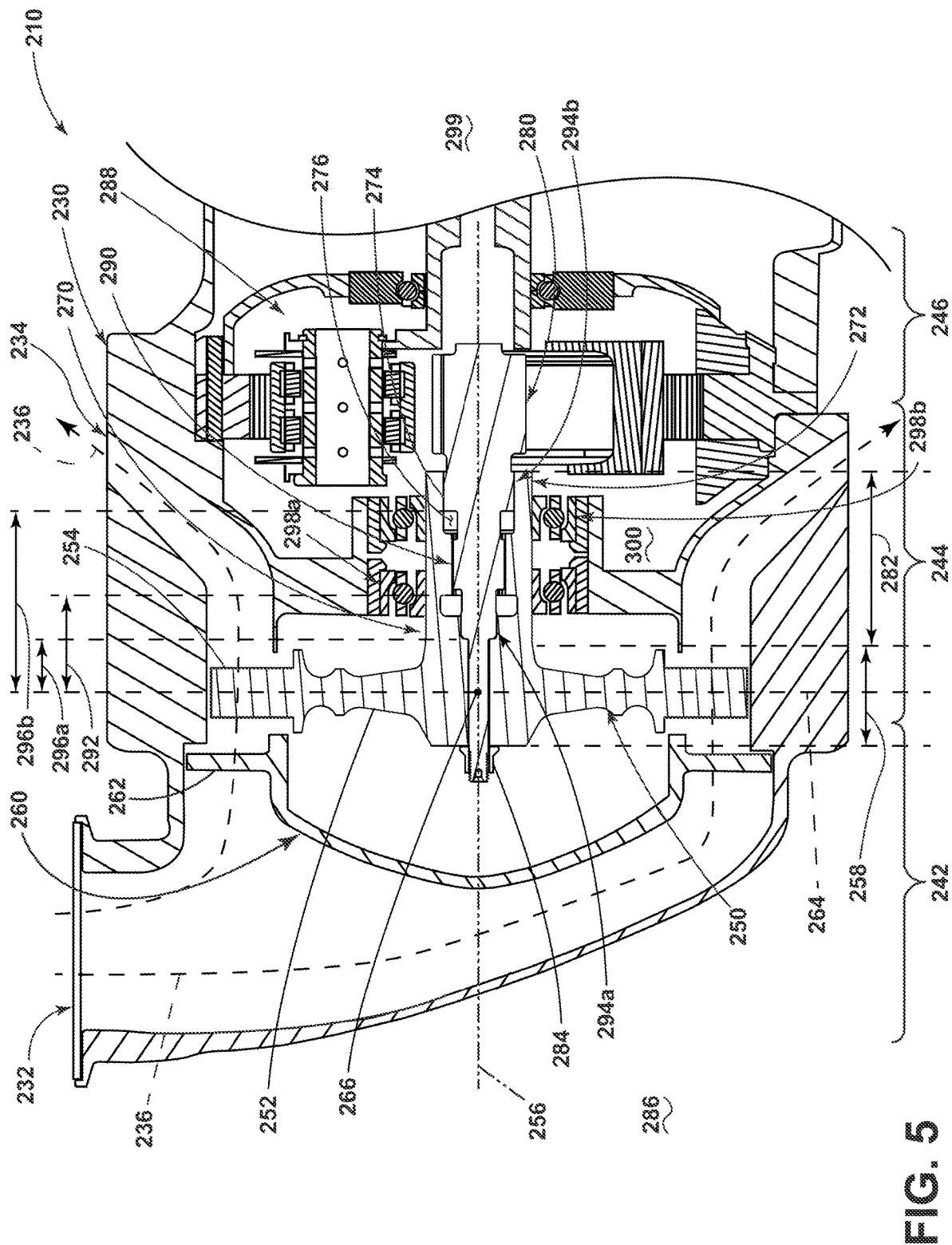
FIG. 5 is a variation of the schematic cross-sectional view of FIG. 3.

FIG. 5 is another example of a schematic cross section of an air starter 210 which shows an inlet assembly 242, a turbine section 244, and a gear box 246 in greater detail. The air starter 210 is similar to the air starter 10, therefore, like parts will be identified with like numerals increased by 200, with it being understood that the description of the like parts of the air starter 10 applies to the air starter 210, unless otherwise noted.

The turbine section 244 can include a turbine 250 located within a housing 230. The turbine 250 can include a rotor 252 and a plurality of circumferentially spaced blades 254. The rotor 252 can be mounted to the housing in a manner for rotation, for example, the rotor 252 can be journaled within the housing 230. The plurality of circumferentially spaced blades 254 can be disposed in a primary air flow path 236 for rotatably extracting mechanical power from the flow of gas from a primary inlet 232 to a primary outlet 234. The turbine 250, the rotor 252, and the plurality of circumferentially spaced blades 254 thereof, can rotate about an axis of rotation 256. A rotor width 258 can be defined as the axial width of the rotor 252 of the turbine 250.

The inlet assembly 242 can include a stator 260 to guide the air flow in the primary air flow path 236. By way of non-limiting example, the stator 260 can define at least a portion of the primary air flow path 236 from the primary inlet 232 to the rotor 252. The stator 260 can include a permeable portion 262, where air in the primary air flow path 236 can pass through the stator 260. The permeable portion 262 can be at least one airfoil, nozzle, vent, or any other structure used to direct or allow the flow of air.

A rotor centerline 264 can pass through a center point 266 of the turbine 250. Further, the rotor centerline 264 can be generally perpendicular to the axis of rotation 256. That is, the angle between the rotor centerline 264 and the axis of rotation 256 can be, and includes, 80 degrees to 100 degrees.

A drive shaft 270 can extend in an axial direction from the rotor 252 of the turbine 250 where the axial direction is defined in the direction of the axis of rotation 256. As illustrated, by way of non-limiting example, the drive shaft 270 can include a sleeve portion 272 having an inner surface 274 that defines a hollow interior 276. The hollow interior 276 can receive at least a portion of a sun gear shaft or output shaft 280. That is, at least a portion of the drive shaft 270 can be tubular, where the output shaft 280 can be received in the hollow interior 276 of the drive shaft 270. The sleeve portion 272 can extend from the rotor 252 a sleeve distance 282.

The output shaft 280 can extend through at least a portion of the inlet assembly 242, the turbine section 244, and the gear box 246. By way of non-limiting example, a retaining element 284 can couple to the drive shaft 270 on a forward side 286 of the rotor 252. The drive shaft 270 can extend through the retaining element 284, the rotor 252, the drive shaft 270, one or more gears or clutch assemblies such as a gear train 288 in the gear box 246. The output shaft 280 can rotatably couple to the gear train 288, so that the output shaft 280 provides a rotational output from the turbine 250 or rotor 252 to the gear train 288. That is, the output shaft 280 allows for the transfer of energy from air in the primary air flow path 236 to rotational mechanical power.

A spline connection 290 can be used to couple the drive shaft 270 to the output shaft 280. The spline connection 290 provides an interface between the drive shaft 270 and the output shaft 280, so that the output shaft 280, the drive shaft 270, and the turbine 250 have generally the same angular velocity. That is, the rotor 252 rotationally drives the output shaft 280 that is coupled to the sleeve portion 272 of the drive shaft 270 that extends axially from the rotor 252.

The spline connection 290 is illustrated, by way of non-limiting example, as located axially between the rotor 252 and the gear train 288, however, the spline connection 290 can be located upstream of the rotor 252, as further illustrated in FIG. 7.

A spline distance 292 can be defined by the axial distance from the rotor centerline 264 to the spline connection 290. By way of non-limiting example, the spline distance 292 is illustrated as the distance between the rotor centerline 264 and the forward side 286 of the spline connection 290. The spline distance 292 is greater than or equal to half the rotor width 258. In other words, the spline connection 290 is offset from the turbine 250, therefore the spline connection 290 is an example of an offset interface.

At least one pilot guide can be located between the rotor 252 and the gear train 288 and axially spaced from the spline connection 290. The at least one pilot guide is illustrated, by way of non-limiting example as a first or forward pilot guide 294a and a second or rear pilot guide 294b. The forward and rear pilot guides 294a, 294b can axially or radially locate the output shaft 280 relative to the drive shaft 270. Further the forward and rear pilot guides 294a, 294b can be axially spaced from each other and from the spline connection 290.

A first pilot distance 296a can be defined by the axial distance from the rotor centerline 264 to the forward pilot guide 294a. By way of non-limiting example, the first pilot distance 296a is illustrated as the distance between the rotor centerline 264 and the forward side 286 of the forward pilot guide 294a. While the first pilot distance 296a is illustrated as smaller or less than the spline distance 292, it is contemplated that the first pilot distance 296a can be greater than the spline distance 292.

The first pilot distance 296a is greater than or equal to half the rotor width 258. In other words, the forward pilot guide 294a is offset from the turbine 250, therefore the forward pilot guide 294a is another example of an offset interface.

A second pilot distance 296b can be defined by the axial distance from the rotor centerline 264 to the rear pilot guide 294b. By way of non-limiting example, the second pilot distance 296b is illustrated as the distance between the rotor centerline 264 and the forward side 286 of the rear pilot guide 294b. While the second pilot distance 296b is illustrated as larger than the spline distance 292, it is contemplated that the second pilot distance 296b can be less than the spline distance 292.

The second pilot distance 296b is greater than or equal to half the rotor width 258. In other words, the rear pilot guide 294b is offset from the turbine 250, therefore the rear pilot guide 294b is another example of an offset interface.

At least one bearing assembly, such as a thrust bearing, can be configured to rotatably support the drive shaft 270. While the at least one bearing assembly is illustrated as a first bearing assembly 298a and a second bearing assembly 298b, any number of bearing assemblies are contemplated. The first bearing assembly 298a and the second bearing assembly 298b can rotatably support the drive shaft 270 at a location that is on a rear side 299 of the turbine 250 and the forward side 286 of the gear train 288. The first bearing assembly 298a can be radially adjacent the forward side 286 of the spline connection 290. The second bearing assembly 298b can be radially adjacent the rear side 299 of the spline connection 290. However, any location in relationship to the drive shaft 270 of the first and second bearing assemblies 298a, 298b is contemplated.

The first bearing assembly 298a or the second bearing assembly 298b can be located in a wet portion 300 of the housing 230. That is, the first bearing assembly 298a or the second bearing assembly 298b can be lubricated with a grease or oil in the wet portion 300 of the housing 230. The wet portion 300 is a cavity or portion in the housing 230 that is exposed to liquid coolant, whereas a dry portion can be a cavity or portion that is not exposed to liquid coolant. By way of non-limiting example of contrast, the forward side of the turbine 250 is a dry portion of the housing 230.

Figure 6:
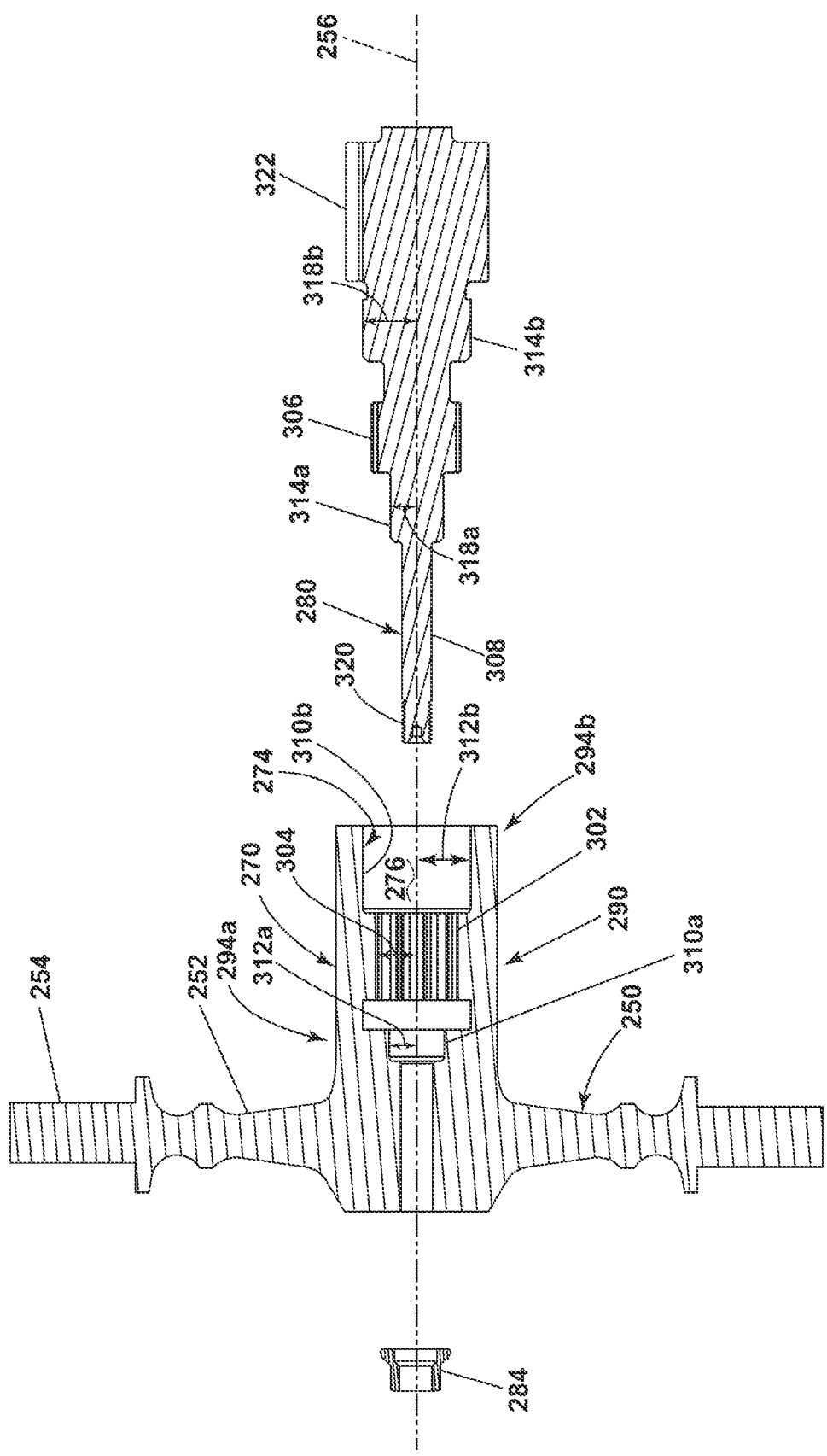
FIG. 6 is an exploded enlarged cross section of the turbine and the output shaft of FIG. 5.

FIG. 6 is an exploded view of the turbine 250, retaining element 284, and output shaft 280. A first spline interface 302 is provided on the drive shaft 270. The first spline interface 302 can be defined by a portion of the inner surface 274 of the sleeve portion 272 of the drive shaft 270. The first spline interface 302 can be notched or serrated so that portions of the first spline interface 302 extend radially into the hollow interior 276 of the drive shaft 270. The first spline interface 302 can have a first spline radius 304 measured from the axis of rotation 256 to a recess in the first spline interface 302.

A second spline interface 306 is provided on the output shaft 280. The second spline interface 306 can be located on an outer surface 308 of a portion of the output shaft 280 received by the drive shaft 270. The second spline interface 306 can be notched or serrated so that portions of the second spline interface 306 extend radially outward from the output shaft 280.

The first spline interface 302 is enmeshed with the second spline interface 306 to form the spline connection 290 when the output shaft 280 is received by the drive shaft 270 as illustrated in FIG. 5. Further, when enmeshed, the first spline interface 302 circumscribes at least part of the second spline interface 306.

A first forward pilot element 310a is provided on the drive shaft 270. The first forward pilot element 310a can be defined by a portion of the inner surface 274 axially spaced from the first spline interface 302. The first forward pilot element 310a is illustrated as being a smooth surface, however, it is contemplated that the first forward pilot element 310a can be notched or serrated. The first forward pilot element 310a can have a first forward pilot radius 312a measured from the axis of rotation 256 to the portion of the inner surface 274 that defines the first forward pilot element 310a. While the first forward pilot radius 312a is illustrated as less than the first spline radius 304, it is contemplated that the first forward pilot radius 312a can be greater than the first spline radius 304.

A second forward pilot element 314a is provided on the output shaft 280. The second forward pilot element 314a can be located on the outer surface 308 of a portion of the output shaft 280 received by the drive shaft 270 and axially spaced from the second spline interface 306. The second forward pilot element 314a illustrated as being a smooth surface, however, it is contemplated that the second forward pilot element 314a can be notched or serrated to compliment the first forward pilot element 310a. The second forward pilot element 314a can have a second forward pilot radius 318a measured from the axis of rotation 256 to the outer surface 308 that defines the second forward pilot element 314a.

A first rear pilot element 310b is provided on the drive shaft 270. The first rear pilot element 310b can be defined by a portion of the inner surface 274 axially spaced from the first spline interface 302. The first rear pilot element 310b is illustrated as being a smooth surface, however, it is contemplated that the first rear pilot element 310b can be notched or serrated. The first rear pilot element 310b can have a first rear pilot radius 312b measured from the axis of rotation 256 to the portion of the inner surface 274 that defines the first rear pilot element 310b. While the first rear pilot radius 312b is illustrated as greater than the first spline radius 304, it is contemplated that the first rear pilot radius 312b can be less than the first spline radius 304.

A second rear pilot element 314b is provided on the output shaft 280. The second rear pilot element 314b can be located on the outer surface 308 of a portion of the output shaft 280 received by the drive shaft 270 and axially spaced from the second spline interface 306. The second rear pilot element 314b illustrated as being a smooth surface, however, it is contemplated that the second rear pilot element 314b can be notched or serrated to complement the first rear pilot element 310b. The second rear pilot element 314b can have a second rear pilot radius 318b measured from the axis of rotation 256 to the outer surface 308 that defines the second rear pilot element 314b.

The first forward or rear pilot elements 310a, 310b and the second forward or rear pilot element 314a, 314b can form the forward or rear pilot guides 294a, 294b, where the first forward or rear pilot element 310a, 310b circumscribes at least a portion of the second forward or rear pilot element 314a, 314b. (FIG. 5) A diametric fit or tight fit between the first forward or rear pilot element 310a, 310b and the second forward or rear pilot element 314a, 314b can secure the radial and axial location of the output shaft 280. The first forward or rear pilot radius 312a, 312b can be between 0.01% and 10% larger than the second forward or rear pilot radius 318*a*, 318*b*, defining the tight fit between the first and second, forward and rear pilot elements 310*a*, 310*b*, 314*a*, 314*b* as having negligible or thermal clearance.

The output shaft 280 can include a threaded portion 320 used to position the retaining element 284. Further, the output shaft 280 includes a sun gear 322 that can rotatably connect with the gear train 288.

FIG. 7 is another example of a schematic cross section of an air starter 410 which shows an inlet assembly 442, a turbine section 444, and a gear box 446 in greater detail. The air starter 410 is similar to the air starter 10, therefore, like parts will be identified with like numerals increased by 400, with it being understood that the description of the like parts of the air starter 10 applies to the air starter 410, unless otherwise noted.

The turbine section 444 can include a turbine 450 located within a housing 430. The turbine 450 can include a rotor 452 and a plurality of circumferentially spaced blades 454. The rotor 452 can be mounted to the housing in a manner for rotation, for example, the rotor 452 can be journaled within the housing 430. The plurality of circumferentially spaced blades 454 can be disposed in a primary air flow path 436 for rotatably extracting mechanical power from the flow of gas from a primary inlet 432 to a primary outlet 434. The turbine 450, the rotor 452, and the plurality of circumferentially spaced blades 454 can rotate about an axis of rotation 456. A rotor width 458 can be defined as the axial width of the rotor 452 of the turbine 450.

The inlet assembly 442 can include a stator 460 to guide the air flow in the primary air flow path 436. By way of non-limiting example, the stator 460 can define at least a portion of the primary air flow path 436 from the primary inlet 432 to the rotor 452. The stator 460 can include a permeable portion 462, where air in the primary air flow path 436 can pass through the stator 460. The permeable portion 462 can be at least one airfoil, nozzle, vent, or any other structure used to direct or allow the through flow of air.

A rotor centerline 464 can pass through a center point 466 of the turbine 450. Further, the rotor centerline 464 can be generally perpendicular to the axis of rotation 456. Generally perpendicular in this context means that the angle between the rotor centerline 464 and the axis of rotation 456 can be, and includes, 80 degrees to 100 degrees.

A drive shaft 470 can extend in an axial direction from the rotor 452 of the turbine 450 where the axial direction is defined in the axial direction of the axis of rotation 456. As illustrated, by way of non-limiting example, the drive shaft 470 can extend from a forward side 486 and a rear side 499 of the rotor 452. The drive shaft 470 can include a sleeve portion 472 having an inner surface 474 that defines a hollow interior 476. The hollow interior 476 can receive at least a portion of a sun gear shaft or output shaft 480. That is, at least a portion of the drive shaft 470 can be tubular, where the output shaft 480 can be received in the hollow interior 476 of the drive shaft 470.

The output shaft 480 can extend through at least a portion of the inlet assembly 442, the turbine section 444, and the gear box 446. By way of non-limiting example, a retaining element 484 can couple to the drive shaft 70 on the forward side 486 of the rotor 452. The drive shaft 470 can extend through the retaining element 484, the rotor 452, the drive shaft 470, one or more gears or clutch assemblies such as a gear train 488 in the gear box 446. The output shaft 480 can rotatably couple to the gear train 488, so that the output shaft 480 provides a rotational output from the turbine 450 or rotor 452 to the gear train 488. That is, the output shaft 480 allows for the transfer of energy from air in the primary air flow path 436 to rotational mechanical power.

A spline connection 490 can be used to couple the drive shaft 470 to the output shaft 480. The spline connection 490 provides an interface between the drive shaft 470 and the output shaft 480, so that the output shaft 480, the drive shaft 470, and the turbine 450 have generally the same angular velocity. That is, the rotor 452 rotationally drives the output shaft 480 that is coupled to the sleeve portion 472 of the drive shaft 470 that extends axially from the rotor 452.

The spline connection 490 is illustrated, by way of non-limiting example, as located axially upstream of the rotor 452. The spline connection 490 can be located on the forward side 486 of the rotor 452 and the rear side 499 of the retaining element 484. However, it is contemplated that the spline connection 490 can be on the rear side 499 of the rotor 452.

A spline distance 492 can be defined by the axial distance from the rotor centerline 464 to the spline connection 490. By way of non-limiting example, the spline distance 492 is illustrated as the distance between the rotor centerline 464 and the rear side 499 of the spline connection 490. The spline distance 492 is greater than or equal to half the rotor width 458. In other words, the spline connection 490 is not located within the rotor 452. Further the spline connection 490 is offset from the rotor 452 or the rotor centerline 464, therefore the spline connection 490 is an example of an offset interface.

At least one pilot guide 494 can be located between the rotor 452 and the gear train 488 and axially spaced from the spline connection 490. The at least one pilot guide 494 can axially locate the output shaft 480 relative to the drive shaft 470.

A pilot distance 496 can be defined by the axial distance from the rotor centerline 464 to the at least one pilot guide 494. By way of non-limiting example, the pilot distance 496 is illustrated as the distance between the rotor centerline 464 and the forward side 486 of the at least one pilot guide 494. While the pilot distance 496 is illustrated as smaller or less than the spline distance 492, it is contemplated that the pilot distance 496 can be greater than the spline distance 492.

The pilot distance 496 is greater than or equal to half the rotor width 458. In other words, the at least one pilot guide 494 is offset from the rotor 452 or the rotor centerline 464, therefore the at least one pilot guide 494 is another example of an offset interface.

At least one bearing assembly, such as a thrust bearing, can be configured to rotatably support the output shaft 480. While the at least one bearing assembly is illustrated as a first bearing assembly 498*a* and a second bearing assembly 498*b*, any number of bearings or thrust bearings are contemplated. The first bearing assembly 498*a* and the second bearing assembly 498*b* can rotatably support the output shaft 480 at a location that is on the rear side 499 of the turbine 450 and the forward side 486 of the gear train 488. The first bearing assembly 498*a* can be axially downstream of the at least one pilot guide 494. The second bearing assembly 498*b* radially between the first bearing assembly 498*a* and the gear train 488. However, any location in relationship to the drive shaft 470 or the output shaft 480 of the first and second bearing assembly 498*a*, 498*b* is contemplated.

The first bearing assembly 498*a* or the second bearing assembly 498*b* can be located in a wet portion 500 of the housing 430. That is, the first bearing assembly 498*a* or the second bearing assembly 498*b* can be lubricated with a grease or oil in the wet portion 500 of the housing 430. The wet portion 500 is a cavity or portion in the housing 30 that is exposed to grease, oil, or other know lubricants, coolants, or liquids, whereas a dry portion can be a cavity or portion that is not exposed to liquid. By way of non-limiting example of contrast, the forward side of the turbine 450 is a dry portion of the housing 430.

Figure 8:
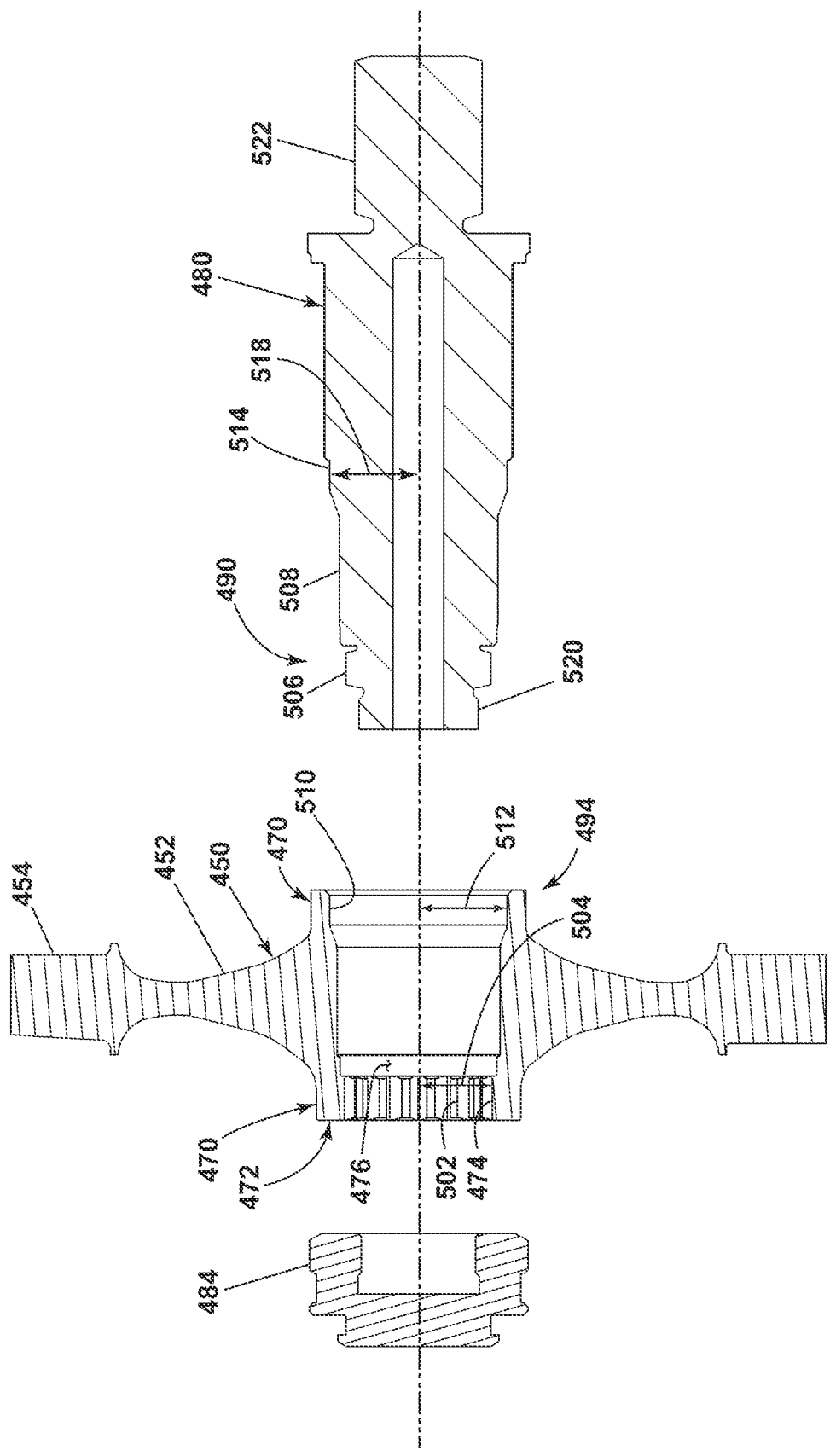
FIG. 8 is an exploded enlarged cross section of the turbine and the output shaft of FIG. 7.

FIG. 8 is an exploded view of the turbine 450, retaining element 484, and output shaft 480. A first spline interface 502 is provided on the drive shaft 470. The first spline interface 502 can be defined by a portion of the inner surface 474 of the sleeve portion 472 of the drive shaft 470. The first spline interface 502 can be notched or serrated so that portions of the first spline interface 502 extend radially into the hollow interior 476 of the drive shaft 470. The first spline interface 502 can have a first spline radius 504 measured from the axis of rotation 456 to a recess in the first spline interface 502.

A second spline interface 506 is provided on the output shaft 480. The second spline interface 506 can be located on an outer surface 508 of a portion of the output shaft 480 received by the drive shaft 470. The second spline interface 506 can be notched or serrated so that portions of the second spline interface 506 extend radially outward from the output shaft 480.

The first spline interface 502 is enmeshed with the second spline interface 506 to form the spline connection 490 when the output shaft 480 is received by the drive shaft 470 as illustrated in FIG. 7. Further, when enmeshed, the first spline interface 502 circumscribes at least part of the second spline interface 506.

A first pilot element 510 is provided on the drive shaft 470. The first pilot element 510 can be defined by a portion of the inner surface 474 axially spaced from the first spline interface 502. The first pilot element 510 is illustrated as being a smooth surface, however, it is contemplated that the first pilot element 510 can be notched or serrated. The first pilot element 510 can have a first pilot radius 512 measured from the axis of rotation 456 to the portion of the inner surface 474 that defines the first pilot element 510. While the first pilot radius 512 is illustrated as greater than the first spline radius 504, it is contemplated that the first pilot radius 512 can be less than the first spline radius 504.

A second pilot element 514 is provided on the output shaft 480. The second pilot element 514 can be located on the outer surface 508 of a portion of the output shaft 480 received by the drive shaft 470 and axially spaced from the second spline interface 506. The second pilot element 514 illustrated as being a smooth surface, however, it is contemplated that the second pilot element 514 can be notched or serrated to compliment the first pilot element 510. The second pilot element 514 can have a second pilot radius 518 measured from the axis of rotation 456 to the outer surface 508 that defines the second pilot element 514.

The first pilot element 510 and the second pilot element 514 can form the at least one pilot guide 494, where the first pilot element 510 circumscribes at least a portion of the second pilot element 514. (FIG. 7) A diametric fit or tight fit between the first pilot element 110 and the second pilot element 114 can secure the radial and axial location of the output shaft 480. The first pilot radius 512 can be between 0.01% and 10% larger than the second pilot radius 518, defining the tight fit between the first and second pilot elements 510, 514. The tight fit can provide clearance needed to accommodate movement of one or more components or to accommodate thermal expiation or contraction or one or more components, while maintaining the axial or radial location of the output shaft 480.

The output shaft 480 can further include a fitted portion 520 that can be received by the retaining element 484. Further, the output shaft 480 includes a sun gear 522 that can rotatably connect with the gear train 488.

Figure 9:
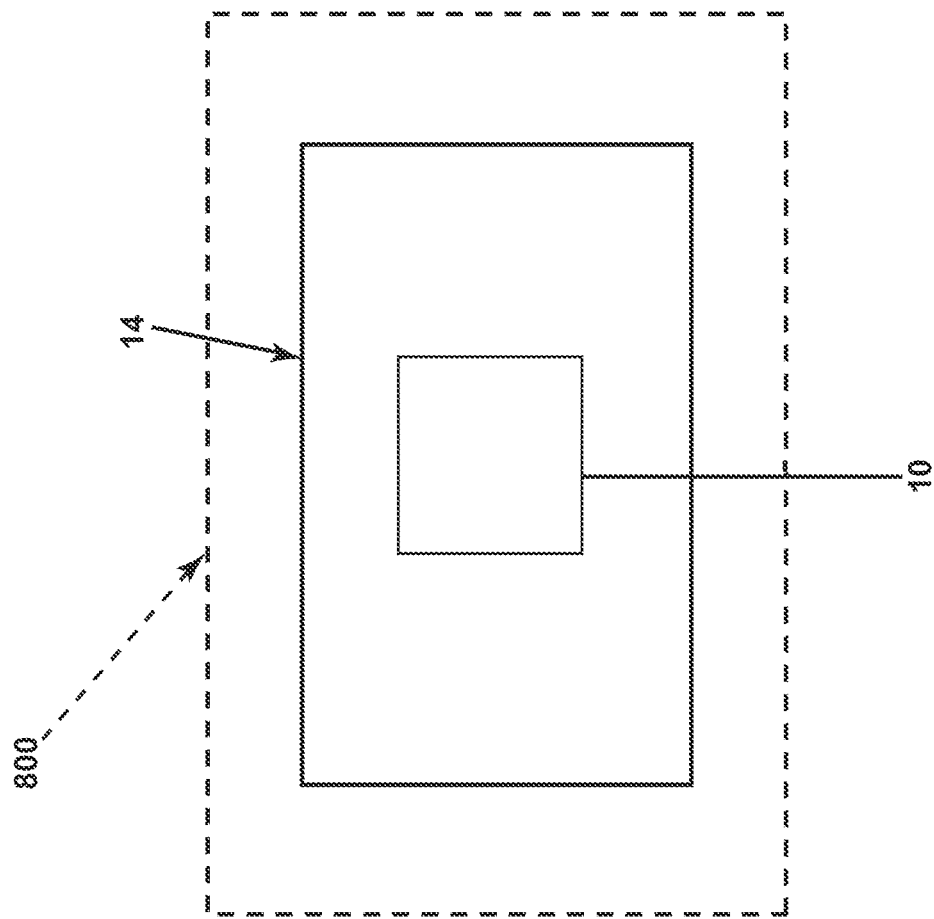
FIG. 9 is a schematic illustration of the turbine engine and air starter from FIG. 1 in a vehicle or structure.

FIG. 9 is a schematic illustration of the turbine engine 14 and starter 10 from FIG. 1, where the turbine engine 14 can be in a vehicle or structure 800. The vehicle or structure 800 can be, by way of non-limiting example, a helicopter or other aircraft, a boat or other aquatic vehicle, or a car or other land vehicle. Further, the vehicle or structure 800 can be, but is not limited to, a marine power plant, a wind turbine, or a small power plant. It is further considered that the turbine engine 14 can be any engine/generator using a turbine with the air starter 10 required by the vehicle or structure 800.

Benefits of the aspects of the disclosure include improved axial positioning of the sun gear shaft or output shaft by the at least one pilot guide. Further, the at least one pilot guide also improves the radial positioning of the sun gear shaft or output shaft.

Another benefit is that the sun gear shaft and the turbine can be made of different materials. For example, the turbine can be made of titanium and the sun gear shaft can be made of steel. The titanium is durable and light, but steel is a preferred material for geared or rotatable interfaces. The offset spline connection offers a known and reliable connection between the titanium drive shaft of the turbine and the steel of the sun gear shaft.

Yet another benefit is that the sun gear can have a smaller diameter. The sun gear shaft is received by the drive shaft of the turbine, allowing the sun gear to have a smaller diameter as it can be made from steel. This can result in a smaller air starter. This can also result in a more robust air starter.

Further, the offset interfaces of the spline connection and the at least one pilot interfaces increases the contact area of the drive shaft and the sun gear shaft, reducing overall stress on the turbine. This can allow for greater critical speed.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

1. An air starter comprising a housing defining an interior having a primary inlet and a primary outlet to define a primary air flow path from the primary inlet to the primary outlet, a turbine located in the interior and including a rotor, with a plurality of circumferentially spaced blades, and a drive shaft extending from the rotor, a gear box located in the interior and including a gear train and an output shaft coupled to the gear train, a spline connection, located upstream of the rotor or between the rotor and the gear train, and comprising a first spline interface provided on the drive shaft and a second spline interface, enmeshed with the first spline interface, provided on the output shaft, and at least one pilot guide, located between the rotor and the gear train, and comprising a first pilot element provided on the drive shaft and a second pilot element provided on the output shaft, wherein the first pilot element axially overlaps, at least in part, the second pilot element.

2. The air starter of clause 1 wherein the drive shaft comprises a sleeve portion having an inner surface defining a hollow interior, which receives at least a portion of the output shaft.

3. The air starter of any of the preceding clauses wherein the first spline interface is located on the inner surface and the second spline interface is located on the portion of the output shaft.

4. The air starter of any of the preceding clauses wherein the portion of the output shaft has an outer surface and the second spline interface is located on the outer surface.

5. The air starter of any of the preceding clauses wherein the first pilot element is located on the inner surface and the second pilot element is located on the portion of the output shaft.

6. The air starter of any of the preceding clauses wherein the at least one pilot guide is axially spaced from the spline connection.

7. The air starter of any of the preceding clauses wherein the turbine includes a rotor centerline and has a rotor width, wherein the spline connection is axially spaced from the rotor centerline a spline distance that is greater than or equal to half of the rotor width.

8. The air starter of any of the preceding clauses wherein the first pilot element is located on the inner surface and the second pilot element is located on the portion of the output shaft.

9. The air starter of any of the preceding clauses wherein the first spline interface circumscribes at least part of the second spline interface.

10. The air starter of any of the preceding clauses wherein the first pilot element circumscribes at least a portion of the second pilot element.

11. The air starter of any of the preceding clauses wherein the at least one pilot guide includes a first pilot guide axially spaced from a second pilot guide.

12. The air starter of any of the preceding clauses wherein the spline connection is axially located between the first pilot guide and the second pilot guide.

13. The air starter of any of the preceding clauses further including at least one bearing assembly located adjacent to the spline connection.

14. The air starter of any of the preceding clauses wherein the at least one bearing assembly is a first bearing assembly and a second bearing assembly, where the first bearing assembly is located adjacent the at least one pilot guide and the second bearing assembly is located adjacent the spline connection.

15. An air starter that includes a housing defining an interior having a primary inlet and a primary outlet to define a primary air flow path from the primary inlet to the primary outlet, a gear box located in the interior and including a gear train and a sun gear shaft wherein the gear train is rotatably coupled the sun gear shaft, a turbine located in the interior and including a rotor, with a plurality of circumferentially spaced blades, and a drive shaft extending from the rotor wherein the drive shaft includes at least one sleeve receiving at least a portion of the sun gear shaft, a spline connection, located upstream of the rotor or between the rotor and the gear train, and comprising a first spline interface provided on the drive shaft and a second spline interface, enmeshed with the first spline interface, provided on the sun gear shaft, and at least one pilot guide, located between the rotor and the gear train, axially spaced from the spline connection, and comprising a first pilot element provided on the drive shaft and a second pilot element provided on the sun gear shaft, wherein the first pilot element overlaps at least a portion of the second pilot element.

16. The air starter of any of the preceding clauses wherein the at least one sleeve has an inner surface defining a hollow interior, which receives at least the portion of the sun gear shaft.

17. The air starter of any of the preceding clauses wherein the first spline interface is located on the inner surface and the second spline interface is located on the portion of the sun gear shaft.

18. The air starter of any of the preceding clauses wherein the portion of the sun gear shaft has an outer surface and the second spline interface is located on the outer surface.

19. The air starter of any of the preceding clauses wherein the first pilot element is located on the inner surface and the second pilot element is located on the portion of the sun gear shaft.

20. The air starter of any of the preceding clauses wherein the turbine includes a rotor centerline and has a rotor width, wherein the at least one pilot guide is axially spaced from the rotor centerline a pilot offset distance that is greater than or equal to half of the rotor width.

What is claimed is:

1. An air starter comprising:
    a housing defining an interior having a primary inlet and a primary outlet to define a primary air flow path from the primary inlet to the primary outlet;
    a turbine located in the interior and including a rotor, with a plurality of circumferentially spaced blades, and a drive shaft extending from the rotor;
    a gear box located in the interior and including a gear train and an output shaft coupled to the gear train;
    a spline connection, located upstream of the rotor or between the rotor and the gear train, and comprising a first spline interface provided on the drive shaft and a second spline interface, enmeshed with the first spline interface, provided on the output shaft; and
    at least one pilot guide, located between the rotor and the gear train, and comprising a first pilot element provided on the drive shaft and a second pilot element provided on an outer surface of the output shaft, wherein the first pilot element axially overlaps, at least in part, the second pilot element.

2. The air starter of claim 1 wherein the drive shaft comprises a sleeve portion having an inner surface defining a hollow interior, which receives at least a portion of the output shaft.

3. The air starter of claim 2 wherein the first spline interface is located on the inner surface and the second spline interface is located on the portion of the output shaft.

4. The air starter of claim 3 wherein the second spline interface is located at the portion of the output shaft on the outer surface.

5. The air starter of claim 4 wherein the first pilot element is located on the inner surface and the second pilot element is located on the portion of the output shaft.

6. The air starter of claim 5 wherein the at least one pilot guide is axially spaced from the spline connection.

7. The air starter of claim 6 wherein the turbine includes a rotor centerline and has a rotor width, wherein the spline connection is axially spaced from the rotor centerline a spline distance that is greater than or equal to half of the rotor width.

8. The air starter of claim 2 wherein the first pilot element is located on the inner surface and the second pilot element is located on the portion of the output shaft.

9. The air starter of claim 1 wherein the first spline interface circumscribes at least part of the second spline interface.

10. The air starter of claim 1 wherein the first pilot element circumscribes at least a portion of the second pilot element.

11. The air starter of claim 1 wherein the at least one pilot guide includes a first pilot guide axially spaced from a second pilot guide.

12. The air starter of claim 11 wherein the spline connection is axially located between the first pilot guide and the second pilot guide.

13. The air starter of claim 1 further including at least one bearing assembly located adjacent to the spline connection.

14. The air starter of claim 13 wherein the at least one bearing assembly is a first bearing assembly and a second bearing assembly, where the first bearing assembly is located adjacent the at least one pilot guide and the second bearing assembly is located adjacent the spline connection.

15. An air starter comprising:
a housing defining an interior having a primary inlet and a primary outlet to define a primary air flow path from the primary inlet to the primary outlet;
a gear box located in the interior and including a gear train and a sun gear shaft wherein the gear train is rotatably coupled the sun gear shaft;
a turbine located in the interior and including a rotor, with a plurality of circumferentially spaced blades, and a drive shaft extending from the rotor wherein the drive shaft includes at least one sleeve receiving at least a portion of the sun gear shaft;
a spline connection, located upstream of the rotor or between the rotor and the gear train, and comprising a first spline interface provided on the drive shaft and a second spline interface, enmeshed with the first spline interface, provided on the sun gear shaft; and
at least one pilot guide, located between the rotor and the gear train, axially spaced from the spline connection, and comprising a first pilot element provided on the drive shaft and a second pilot element provided on an outer surface of the sun gear shaft, wherein the first pilot element overlaps at least a portion of the second pilot element.

16. The air starter of claim 15 wherein the at least one sleeve has an inner surface defining a hollow interior, which receives at least the portion of the sun gear shaft.

17. The air starter of claim 16 wherein the first spline interface is located on the inner surface and the second spline interface is located on the portion of the sun gear shaft.

18. The air starter of claim 17 wherein the second spline interface is located at the portion of the sun gear shaft on the outer surface.

19. The air starter of claim 18 wherein the first pilot element is located on the inner surface and the second pilot element is located on the portion of the sun gear shaft.

20. The air starter of claim 15 wherein the turbine includes a rotor centerline and has a rotor width, wherein the at least one pilot guide is axially spaced from the rotor centerline a pilot offset distance that is greater than or equal to half of the rotor width.

* * * * *